(12) United States Patent
Moore et al.

(10) Patent No.: US 6,460,290 B1
(45) Date of Patent: Oct. 8, 2002

(54) FULLY COMPATIBLE SURFACTANT-IMPREGNATED WATER-SOLUBLE FERTILIZER; CONCENTRATE; AND USE

(76) Inventors: Robert A. Moore, 614 Fox Run Rd., Sewell, NJ (US) 08080; Stanley J. Kostka, 365 Bortons Mill Rd., Cherry Hill, NJ (US) 08034; Santakumari Mane, 211 S. Lincoln Avenue, Cherry Hill, NJ (US) 08002; Christopher M. Miller, 24 Chelsea Cir., Clementon, NJ (US) 08021

( * ) Notice: Subject to any disclaimer, the term of this patent is extended or adjusted under 35 U.S.C. 154(b) by 0 days.

(21) Appl. No.: 09/613,956

(22) Filed: Jul. 11, 2000

(Under 37 CFR 1.47)

Related U.S. Application Data

(63) Continuation of application No. 09/036,457, filed on Mar. 6, 1998, now abandoned.
(60) Provisional application No. 60/040,126, filed on Mar. 7, 1997.

(51) Int. Cl.[7] .......................... A01G 29/00; C05B 7/00; C05G 5/00; C05C 9/00; C05C 1/00
(52) U.S. Cl. ............................. 47/48.5; 71/11; 71/28; 71/31; 71/34; 71/54; 71/58; 71/63; 71/64.1
(58) Field of Search ................ 504/116; 71/DIG. 1, 71/11, 28, 58, 63, 34, 54, 31, 64.1; 47/48.5; 514/777, 786

(56) References Cited

U.S. PATENT DOCUMENTS

| | | | |
|---|---|---|---|
| 5,238,909 A | 8/1993 | Welter et al. .............. 504/271 |
| 5,385,750 A | 1/1995 | Aleksejczyk et al. .......... 427/4 |
| 5,468,718 A | 11/1995 | Burval et al. ............... 504/206 |
| 5,612,285 A | 3/1997 | Arnold ...................... 504/206 |
| 5,770,543 A | 6/1998 | Garst et al. ................. 504/116 |

FOREIGN PATENT DOCUMENTS

| | | |
|---|---|---|
| CA | 2093377 | 4/1993 |
| EP | 0 299 654 | 6/1988 |
| EP | 0 498 785 | 2/1992 |
| GB | 980770 | 2/1963 |
| WO | WO 89/00079 | 1/1989 |
| WO | WO 93/22917 | 11/1993 |
| WO | WO 95/03881 | 2/1995 |
| WO | WO 9528083 | 10/1995 |
| WO | WO 95/28410 | 10/1995 |
| WO | WO 96/23408 | 8/1996 |
| WO | WO 96/34078 | 10/1996 |

*Primary Examiner*—Wayne A. Langel

(57) ABSTRACT

Solid surfactant-impregnated, water-soluble fertilizer compositions are disclosed together with aqueous concentrates made therefrom. The use of dilute aqueous compositions made from said concentrates to enhance the rewetting of water uniformity and nutrient retention characteristics of initially untreated plant culture media is also disclosed.

The fertilizer composition solids are friable and are composed of from 65 to 99 weight percent water-soluble fertilizer; and from 1 to 35 weight percent of a surfactant system comprising water-soluble nonionic surfactant and alkyl polyglycoside in a weight ratio of from less than 2:1 to 1:5. When these solid compositions are dissolved in water to form concentrates having from 20 to 50 weight percent fertilizer, the concentrates are both single phased and extremely stable.

10 Claims, No Drawings

FULLY COMPATIBLE SURFACTANT-IMPREGNATED WATER-SOLUBLE FERTILIZER; CONCENTRATE; AND USE

This application claims the benefit of the disclosure of U.S. Provisional Patent Application Ser. No. 60/040,126 filed Mar. 7, 1997 and is a continuation of application Ser. No. 09/036,457 filed Mar. 6, 1998, abandoned.

BACKGROUND OF THE INVENTION

1. Field of the Invention

The present invention relates to novel surfactant-impregnated, water-soluble fertilizer compositions which form dry, flowable products that are readily soluble and disperse easily in water. Furthermore, when solubilized, these compositions form a single phase solution over a wide range of fertilizer concentrations. The invention also relates to the use of said compositions when properly diluted to treat plant culture media and thereby improve certain properties thereof. More particularly, the instant invention relates to surfactant-compatibilizer-fertilizer compositions that i) at high fertilizer concentrations in water are extremely stable, i.e., do not phase separate; and ii) when diluted and applied to various plant culture media, improve both water and nutrient retention in said media.

2. Description of the Prior Art

Many methods have been suggested for enhancing the properties of plant culture media such as earth, horticultural soils, and various soil-mimicking, soil-less plant culture substrates. By "enhancing the properties" is meant that such techniques are capable, directly or indirectly, of promoting growth, increasing yield and/or improving the quality of the plant products grown therein.

To enhance plant culture media and/or to provide a substrate for the delivery of nutrients, various mineral-based materials have been used such as bentonite (frequently used for ameliorating light sandy soils); perlite; montmorillonites; heat-expanded naturally occurring clays, for example, vermiculite; and synthetically produced and natural silicate containing clays. Also, it has long been known that organic matter such as humus, composted bark or comminuted peat, e.g., a sphagnum, sedge, or hypnum peat in soil helps the soil to absorb and retain moisture and improves the ability of the soil surface to be penetrated by water.

Additional plant culture media performance enhancing materials are, of course, the fertilizers. In the horticulture and floriculture fields, especially in the production of greenhouse crops, water-soluble fertilizers are predominantly the fertilizers of choice. Fertilizers are complex mixtures of inorganic and, optionally, organic components which are capable of providing the elements required for plant growth. Such nutrient elements include, more particularly, N, P, K, Ca, Mg, Fe, Mn, Zn, Cu, Mo, B, Co, S, and Na. Sustained-release nitrogen fertilizers have been selected, for example, from organic nitrogen compounds such as urea-formaldehyde condensate or crotonylidene-diurea, whereas ammonium, nitrate and armide nitrogen compounds are among the quick-acting constituents. Ammonium, potassium, magnesium and calcium phosphates that are soluble in water have proven to be useful for supplying plants with phosphate. Potassium is employed, for example, in the form of $K_2SO_4$, $K_2HPO_4$, $KH_2PO_4$, or $KCl$, but potassium magnesium sulfate is also often used. Magnesium may be employed in the form of various sulfate salts. Further fertilizer components are, for example, ammonium molybdate, iron sulfate, and zinc sulfate as well as boric acid and chelated trace elements. Suitable organic components that may be used as nutrients and/or as aggregates or fillers in plant growth media are biomasses from bacteria and fungi, urea, horn shavings, horn meal, blood and bone meal, seaweed powder and the like.

As an aside, fertilizer particles, in general, tend to exhibit at least one undesirable characteristic. Fertilizers per se tend to "cake" and the "caking" interferes with their handling in bulk by the producer and by the end user. This fertilizer caking is believed to be caused by several factors, e.g., the formation of crystalline bridges according to which solid connections are formed at the points of contact among the granules. Alternatively, there may be capillary adhesion or bonding between the granules with a significant force often being necessary to break this adhesion or bonding. The cohesive forces will vary depending upon the storage conditions and other variables. The hygroscopic nature of the fertilizers also results in undesirable caking. In all cases, however, the caking causes a serious problem to which a completely satisfactory solution is lacking.

Surfactant wetting agents are commonly applied to plant culture media to enhance certain characteristics of the media; specifically initial water retention; water penetration; uniformity of wetting; and rewetting properties of the substrate. Nonionic and anionic surfactants are currently being marketed in the United States as wetting agents for plant culture media in greenhouse production. However, anionic surface active agents may be adversely affected by salts and other compounds normally contained in the media substrate. Furthermore, nonionic surfactants are less likely to deleteriously affect beneficial bacteria normally contained in the plant culture media, such as soil, than are the anionic surfactants. Also, nonionic surface active agents do not ionize and, because of this, are comparatively insensitive to electrolytes found in the media substrate. As a result of the above, and also due to their overall efficacy and phyto-safety, nonionic surfactants make up the greatest proportion of the wetting agents sold in the U.S. and, in fact, worldwide for plant culture media enhancement.

These nonionic wetting agents must have some significant solubility in water. Examples of such water-soluble materials are the following:

1) block-polymeric polyether glycols obtained, for example, by the addition of ethylene oxide on a condensation product of propylene oxide with propylene glycol;
2) alkylphenol-polyethylene oxide condensates which are condensation products of alkylphenols with ethylene oxide;
3) condensation products of aliphatic alcohols with ethylene oxide;
4) condensation products of ethylene oxide with the products resulting from the reaction of propylene oxide and ethylene diamine;
5) ammonia, monoethanol and diethanol amides of acyl fatty acids. These acyl moieties are normally derived from naturally occurring glycosides, but can be derived synthetically, and
6) various semi-polar, long chain nonionics including:
   i) tertiary amine oxides;
   ii) tertiary phosphine oxides; and
   iii) sulfoxides The two predominant groups of nonionic surfactants used in plant culture growing media are the alkylphenol polyethoxylates and the polyols; the preferred being the alkylphenol polyethoxylates.

When water-soluble fertilizer and nonionic wetting agents are to be transported to a plant culture media site, it is usually accomplished through aqueous irrigation delivery systems ending in an overhead spray or drip line. Water-soluble fertilizers may also be delivered via a range of subirrigation systems as a component of the standard irrigation process. Although both products are commonly used, each is often solubilized and kept as a concentrated solution in a separate stock tank and then pumped, diluted, and injected independently into the irrigation system. The reason that the fertilizer and the nonionic surfactants are solubilized in separate tanks is that concentrated fertilizer solutions are usually incompatible with horticultural wetting agents such as the nonionics. Incompatibility may be characterized as resulting in the formation of a multiphased solution, e.g., the separation of the surfactant from the concentrated aqueous fertilizer solution or the salting out of one or more of the fertilizer components. Incompatibility between water soluble fertilizers and wetting agent surfactants is of minor concern in diluted fertilizer solutions; however, as the concentrations increase to levels that are desired in stock tanks, i.e., especially from about 20 to about 50 weight percent, compatibility becomes a major concern.

The detergency art has taught that when nonionic surfactants are blended with alkylpolyglycosides as co-surfactants, there is realized increased corrosion inhibition, improved foam stabilization and enhanced laundry detergency over a wide range of fabrics (U.S. Pat. No. 4,483,780).

Co-surfactant blends of alkylpolyglycosides and an anionic surfactant such as alkyl naphthalene sulfonate have been added to pesticides to lower the surface tensions of these compositions (U.S. Pat. No. 5,516,747).

U.S. Pat. No. 5,385,750 discloses that the wetting ability of an aqueous mixture of an aliphatic glycoside and a material to be spread, such as a pesticide, especially when there is a need to penetrate an oily or waxy layer, is improved by the addition of a fatty alcohol. The fatty alcohol-glycoside adjuvants are also taught to be compatible with nitrogenous fertilizer products.

U.S. Pat. No. 5,258,358 teaches compositions for controlling undesired vegetation comprising a specific, novel herbicide, an alkyl polyglycoside, and at least one surfactant selected from the series comprising a fatty alcohol polyglycol ether sulfate, an alkydimethylamine oxide, an alkyldimethylbenzylammonium chloride and a coconut alkyldimethylaminoacetic acid or salt thereof.

A PCT publication by Zeneca Limited (WO 96/00010) discloses glyphosate herbicidal compositions which have "good activity in the absence of rain with effective rainfastness" by blending the herbicide with an adjuvant compositions comprising an alkylpolyglycoside and an ethoxylated alcohol.

Horticulturists and others working with plant culture media are currently faced with a dilemma viz whether or not to pre-treat the media with a wetting agent. By "pretreat" is meant that a wetting agent, usually a nonionic surfactant has been intimately mixed with the plant culture media; the amount generally being equivalent to from 0.1–20 fluid ounces/cubic yard. One "pre-treats" the media if one seeks to improve the uniformity of wetting and water retention of the media both initially (T=0) and over extended periods of time (with or without re-watering). Most premium commercial plant growth media are pre-treated with a surfactant. Secondary tier manufacturers and grower-produced culture media often do not contain a surfactant.

Objects of the Invention

Thus, it is an object of this invention to provide solid, non-agglomerating or at least friable, particulate water-soluble fertilizer compositions which can be readily solubilized in water to form compatible, i.e., single phase concentrated solutions. Furthermore, it is another object of this invention to provide a process whereby the plant culture media water retention and uniformity levels after a short period of time (usually 7–10 days) and a dry-down (to less than 20% water) can be brought to essentially initial (T=0) pre-treat media levels with greatly enhanced retention of fertilizer nutrients.

SUMMARY OF THE INVENTION

The instant invention relates to agrochemical compositions which may comprise, consist of, or consist essentially of a bioactive chemical composition, especially a water-soluble fertilizer and a preferred surfactant system, especially one comprising an alkylphenol ethoxylate or a polyol surfactant and an alkylpolyglycoside compatibilizer.

The invention also relates to a process for obtaining and sustaining high water retention and uniformity levels of plant culture media that has not been pre-treated as compared to that achievable with pre-treated media, together with the enhancement of fertilizer nutrient levels over that heretofore realizable with similar pre-treated media. This process comprises the application of the aforedescribed fertilizer compositions of this invention to media that has not been pre-treated. Additionally, this technology enables an end user to formulate a single product in one tank concentrate rather than having to purchase and maintain two or more separate tanks and control the blending of the individual components to avoid the aforementioned phase separation risk. Additionally, a significant cost savings can be realized by plant culture media users by i) not having to pre-treat the media prior to use and ii) reducing the amount of fertilizer leaching that occurs on initial liquid fertilizer applications.

DETAILED DESCRIPTION OF THE INVENTION

It has surprisingly been discovered that certain water-soluble fertilizers can be prepared in high aqueous concentrations, i.e., from 20 to 50 weight percent, in the presence of relatively small quantities of a surfactant system such that the overall composition concentrate is compatible, i.e., no phase separation occurs, and such compatibility remains stable over extended periods of time. The surfactant system comprises an intimate blend of a nonionic surfactant and a higher alkyl glucoside compatibilizer in a weight ratio of from less than 2:1 to 1:5 and a weight percent in the concentrate of from 0.5 to 10. All weight percents expressed in this specification and claims are based on the total respective composition weight.

Additionally, the solid, particulate fertilizer compositions of this invention ameliorate much of the caking, i.e., agglomeration problems inherent in many of the fertilizer compositions of the prior art in that the instant solid compositions are friable. That is, although particle adherence can occur, the particle-to-particle connections or binding forces are very weak and easily broken via mild pressure or mechanical force, e.g., agitation or vibration.

Furthermore, and serendipitously, use of the fertilizer compositions of this invention, when appropriately diluted with water and applied to plant culture media, permits the end user to not only obviate the necessity of starting with a pre-treated substrate but also realizes high water retention concomitantly with significantly enhanced nutrient retention, i.e., even with high water retention, nutrient leaching can be minimized. Nutrient leaching is a significant problem in the art. For example, with heavy precipitation or watering, nitrate is washed out fairly quickly in untreated media. The considerable nitrogen loss can have a severe growth-inhibiting effect. Attempts to correct the problem can result in expensive overfeeding or underfeeding of the plants.

Suitable water-soluble plant nutrients are all known water-soluble inorganic and/or organic fertilizers, fertilizing salts, or mineral fertilizers, for example, urea, urea phosphate, ammonium nitrate, ammonium sulfate, mono- and di-ammonium phosphate, monopotassium phosphate, potassium chloride, potassium sulfate, potassium phosphate, potassium nitrate, ammonium sulfate-nitrate, Chilean nitrate, potassium-ammonium phosphate, sodium nitrate, nitrogenous fertilizers, urea-containing mixed fertilizers, potassium salts, N, P, K-compound fertilizers, N, P, K-compound fertilizers containing trace elements and mixtures of such fertilizers or mineral fertilizers.

Suitable water-soluble micronutrients are especially the chlorides, sulfates, or nitrates of Ca, Mg, Fe, Ni, Mn, Zn, Cu, and Co as well as Mo in the form of water-soluble molybdates and boron in the form of boric acid or boric anhydride.

To ensure that the aforesaid salts are soluble in water, cations of the micronutrients are often used in complexed or partially complexed form. For making solid products, mixtures of water-soluble micronutrient salts and water-soluble complex formers can also be used so that the micronutrient cations are complexed upon dissolution of the solid mixture in water. Known complexing agents are, for example, alkali metal salts of N-carboxyalkyl-amino acids which may form water-soluble chelate compounds with micronutrient cations. It is generally known that the micronutrients have to be water-soluble so that the plants can absorb and utilize them. Thus, commercialized micronutrients generally contain the salts in complexed form.

The proportion of the individual plant nutrients in the compositions of this invention is not critical and can be adapted to the usual and known requirements for fertilizers.

The nonionic wetting agents of this invention should have significant solubility in water. Examples of such water-soluble compounds are the following:

1) block-polymeric glycols obtained, for example, by the addition of ethylene oxide on a condensation product of propylene oxide with propylene glycol;
2) alkylphenol-polyethylene oxide condensates which are condensation products of alkylphenols with ethylene oxide;
3) condensation products of aliphatic alcohols with ethylene oxide;
4) condensation products of ethylene oxide with the products resulting from the reaction of propylene oxide and ethylene diamine;
5) ammonia, monoethanol and diethanol amides of acyl fatty acids. These acyl moieties are normally derived from naturally-occurring glycosides, but can be derived synthetically, and
6) various semi-polar, long chain nonionics including:
   i) tertiary amine oxides;
   ii) tertiary phosphine oxides; and
   iii) sulfoxides The two predominant groups of nonionic surfactants presently used in plant culture growing media are the alkylphenol polyethoxylates and the polyols; the preferred being the alkylphenol polyethoxylates.

The alkylphenol ethoxylates are alkylphenol-polyethylene oxide condensates of alkyl phenols having at least one alkyl group containing from 4 to 20, preferably 5 to 12 carbon atoms in either a straight chain or branched chain configuration on the phenol and condensed with ethylene oxide, the said ethylene oxide being present in amounts equal to 2 to 50 moles of ethylene oxide per mole of alkyl phenol; preferably 5 to 25. The alkyl substituent in such compounds may be derived from, but not limited to polymerized propylene, diisobutylene, octene, or nonene, for example.

Examples of compounds of this type include nonyl phenol condensed with about 9.5 moles of ethylene oxide per mole of nonyl phenol; dodecylphenol condensed with about 12 moles of ethylene oxide per mole of phenol, diamyl phenol condensed with about 9 moles of ethylene oxide per mole of phenol; dinonyl phenol condensed with about 15 moles of ethylene oxide per mold of phenol; and diisooctyl phenol condensed with about 15 moles of ethylene oxide per mole of phenol. Commercially available nonionic surfactants of this type include the Igepal series of nonionics, e.g., CO-630 and DAP-9 marketed by Rhodia Inc.

The polyols, which as mentioned above, are the block-polymeric glycols obtained, for example, by the addition of ethylene oxide (EO) on a condensation product of propylene oxide (PO) with propylene glycol. The block polyoxypropylene core, being the hydrophobe, have PO units at least about 9, and are usually in the range of from about 950 mass average molecular weight to about 4,000 molecular weight. The ethylene oxide (EO) is added to the core at from about 10% to about 80%. In a preferred embodiment, the polyoxypropylene core mass average molecular weight is about 1750 with EO addition of from about 20 to about 40 weight percent. The reverse block copolymers are also acceptable for use in the instant invention, i.e., those with a polyoxyethylene core and polypropylene oxide addition. Commercially available nonionic block polymeric surfactants of this type include those of the Antarox series, e.g., L-62 and L-64 also marketed by Rhodia Inc.

Alkyl glycosides are understood to be the reaction products of sugars and fatty alcohols, suitable sugar components being the aldoses and ketoses such as glucose, fructose, mannose, galactose, talose, gulose, allose, altrose, idose, arabinose, xylose, lyxose, lactose, sucrose, maltose, maltotriose, cellobiose, mellobiase, and ribose, which are referred to hereinafter as glycoses. Particularly preferred alkyl glycosides are alkyl glucosides by virtue of the ready availability of glucose. In its broadest sense, the term "alkyl" in alkyl glycoside is intended to encompass the residue of an aliphatic alcohol, preferably a fatty alcohol, obtainable from natural fats, i.e., saturated and unsaturated residues and also mixtures thereof, including those having different chain lengths. The terms alkyl oligoglycoside, alkyl polyglycoside, alkyl oligosaccharide and alkyl polysaccharide apply to alkylated glycoses of the type in which one alkyl radical in the form of the acetal is attached to more than one glycose residue, i.e., to a polysaccharide or oligosaccharide residue; these terms are generally regarded as synonymous with one another. Accordingly, alkyl monoglycoside is the acetal of a monosaccharide. Since the reaction products of the sugars and the fatty alcohols are generally mixtures, the term alkyl glycoside is intended to encompass both alkyl monoglycosides and also alkyl poly(oligo) glycosides.

Optionally, there can be a polyoxyalkylene chain joining the alcohol moiety and the saccharide moiety. The preferred alkoxide is ethylene oxide.

The higher alkyl glycosides express surfactant properties. By "higher alkyl glycoside" is meant a glycoside having an alkyl substituent that averages more than four carbon atoms in size.

The lipophilic groups in the alkyl polyglycosides are derived from alcohols, preferably monohydric for compatibilizer applications and should contain from 4 to 22, preferably 7 to 16 carbon atoms. While the preferred groups are saturated aliphatic or alkyl, there may be present some unsaturated aliphatic hydrocarbon groups. Thus, the preferred groups are derived from the fatty alcohols derived from the naturally-occurring fats and oils, such as octyl, decyl, dodecyl, tetradecyl, hexadecyl, octadecyl, oleyl and linoleyl, but groups may be derived from synthetically produced Ziegler alcohols or oxo alcohols containing 9, 10, 11, 12, 13, 14 or 15 carbon atoms. The alcohols of naturally-occurring fatty acids, typically containing an even number of carbon atoms and mixtures of alcohols, are commercially available such as mixtures of $C_8$ and $C_{10}$, $C_{12}$ and $C_{14}$, and the like. Synthetically-produced alcohols, for example those produced by an oxo process, contain both an odd and even number of carbon atoms such as the $C_9$, $C_{10}$, $C_{11}$, mixtures.

From their production, the alkyl glycosides may contain small quantities, for example 1 to 2%, of unreacted long-chain alcohol which does not adversely affect the properties of the surfactant systems produced with them.

Specifically, the preferred alkylpolyglycosides for use in the present invention are obtained by the reaction of alkanols with glucose or other mono- or di- or polysaccharides. Preferred alkylpolyglycosides for use in the present invention are alkylpolyglucosides obtained by the reaction of glucose with a straight or branched chain alkanol or mixture of alkanols, for example, a mixture of alkanols containing 4 to 22, preferably 7 to 16 carbon atoms, for example, 8 to 10 carbon atoms. The number of glucose groups per alkyl group in the molecule may vary and alkyl mono- or di- or polyglucose or saccharide derivatives are possible. Commercial alkylpolyglucosides usually contain a mixture of derivatives having an average number of glycose groups per alkyl group (the Degree of Polymerization or D.P.) of between 1 and 4 for example, preferably from 1 to 2. A number of suitable alkylpolyglycosides are commercially available and include, for example, AL2042 (ICI); AGRIMUL 2069 or AGRIMUL PG 2067 (Henkel) and ATPLUS 258 (ICI).

Illustrative of the many processes available for the preparation of alkyl polyglycosides useful in the present invention are those disclosed in the following U.S. Pat. Nos. 4,950,743; 5,266,690; 5,304,639; 5,374,716; 5,449,763; and 5,457,190.

Where a solid, friable water-soluble surfactant system/fertilizer granular product is desired, the surfactant system which, at a minimum includes the nonionic surfactant-alkylglycoside compatibilizer components, can be added to the water-soluble fertilizer by using a variety of common application methods well known in the art. The components of the surfactant system can be pre-blended, which is preferred, and added to the fertilizer or they can be added individually at the same time or sequentially. Typical processes for producing the solid particulate products of this invention include first adding the fertilizer components into a blending or shearing device such as a Hobart Mixer, a rotary blender such as a Continental Blender, ribbon blender or a high shear mixer. The components of the surfactant system are then added as described above. When using a rotary blender, the surfactant system is preferably heated to between 80° F. and 150° F. and sprayed onto the fertilizer. In the high shear systems, application of the surfactant system at ambient temperatures usually suffices. When the Hobart Mixer is utilized, preferably the product is further processed through a ball mill, a hammer mill, or similar equipment to eliminate agglomerated lumps. In a ribbon blender, both heated and unheated surfactant have been successfully used.

In the surfactant system of this invention, the nonionic surfactant to alkylpolyglycoside ratio must be from less than 2:1 to 1:5; preferably from less than 1.4:1 to 1:2.

The total water-soluble fertilizer concentration in the solid fertilizer-surfactant system compositions of this invention is from 65 to 99 weight percent; preferably from 85 to 94 weight percent based on the fertilizer-surfactant system weight. The total surfactant system concentration in the solid fertilizer-surfactant system compositions of this invention is from 1 to 35 weight percent; preferably from 6 to 15 weight percent based on the fertilizer-surfactant system weight.

Stable concentrated aqueous solutions or dispersions of the water-soluble fertilizer-surfactant system compositions of this invention can be prepared by mixing the afore-described solid compositions of this invention with an appropriate amount of water, which is the preferred method or mixing the individual components with an appropriate amount of water at the same time or sequentially.

The total water-soluble fertilizer concentration in the aqueous, stable, single-phase fertilizer concentrates of this invention is from 20 to 50 weight percent; preferably from 30 to 40 weight percent based on the total weight of the aqueous concentrate. The total surfactant system concentration in the aqueous concentrates of this invention is from 0.5 to 10 weight percent, preferably from 2 to 6 weight percent based on the total weight of the aqueous concentrate.

The aqueous fertilizer concentrates of this invention are stable, i.e., do not phase separate, for extended periods of time. When needed for use, the concentrate is diluted with additional water to the desired concentration. The dilute fertilizer concentrations are preferably applied as a fine spray, droplets, or drench. Subsequent working of the media will further disperse the composition. In order to easily disperse the compositions of this invention over the requisite area of the plant culture media, the composition concentration in the applied solution should be relatively low. It has been found that concentration of the fertilizer and surfactant system ranging from 0.01 to 5 percent by weight in water is usually satisfactory. The concentrations that are applied, for example, to plant culture media, are not critical and can be adapted to the practical requirements in each case, depending, for example, on the type of plants and the properties of the soil. In any such event, appropriate concentration levels are well known in the art.

Other than in the operating examples, or where otherwise indicated, all numbers expressing quantities of ingredients or reaction conditions used herein are to be understood as modified in all instances by the term "about".

The following examples serve to illustrate, but not limit, the invention. All parts and percentages are by weight, unless otherwise noted.

EXAMPLE 1

A series of solutions are prepared utilizing a water-soluble N—P—K fertilizer mixture, viz a 20-20-20 blend. In 250 ml glass containers, the 20-20-20 fertilizer at three aqueous concentrations, i.e., 25, 40 and 50 weight percent are mixed with five percent aqueous solutions ranging from 0.25 to 2.0 weight percent of AquaGro 2000M, a trademark of Aquatrols Corporation of America for a nonionic alkylphenol ethoxylate, specifically 2,4-ditertamylphenol (9 EO). As can be seen from Table 1 below, at the high fertilizer concentrations of these tests, the fertilizer and nonionic surfactant are incompatible for either a precipitate developed or two phases formed within minutes.

Next, five 20-20-20 aqueous fertilizer solutions are prepared in 250 ml glass containers, at each of three concentrations as above, i.e., at 25, 40, and 50 weight percent. One to one weight ratio blends of AquaGro 2000M and a $C_{8-10}$ G1.7 alkyl polyglycoside (Agrimul PG 2067 sold by Henkel Corporation) at five concentration blends of from 0.5 to 4.0 weight percent are individually prepared and added to each of the 20-20-20 fertilizer solutions as indicated in Table 1 below.

TABLE 1

| 20-20-20 Fertilizer (Weight %) | Aqua-Gro 2000 M (Weight %) | Compatible (Yes/No) | 20-20-20 Fertilizer (Weight %) | Aqua-Gro 2000 M (Weight %) | Agrimul PG 2067 (Weight %) | Compatible (Yes/No) |
|---|---|---|---|---|---|---|
| 25 | 0.25 | No | 25 | 0.25 | 0.25 | Yes |
| 25 | 0.5 | No | 25 | 0.5 | 0.5 | Yes |
| 25 | 0.75 | No | 25 | 0.75 | 0.75 | Yes |
| 25 | 1.0 | No | 25 | 1.0 | 1.0 | Yes |
| 25 | 2.0 | No | 25 | 2.0 | 2.0 | Yes |
| 40 | 0.25 | No | 40 | 0.25 | 0.25 | No |
| 40 | 0.5 | No | 40 | 0.5 | 0.5 | Yes |
| 40 | 0.75 | No | 40 | 0.75 | 0.75 | Yes |
| 40 | 1.0 | No | 40 | 1.0 | 1.0 | Yes |
| 40 | 2.0 | No | 40 | 2.0 | 2.0 | Yes |
| 50 | 0.25 | No | 50 | 0.25 | 0.25 | No |
| 50 | 0.5 | No | 50 | 0.5 | 0.5 | Yes |
| 50 | 0.75 | No | 50 | 0.75 | 0.75 | Yes |
| 50 | 1.0 | No | 50 | 1.0 | 1.0 | Yes |
| 50 | 2.0 | No | 50 | 2.0 | 2.0 | Yes |

The results show that, except for fertilizer concentrations of 40 weight percent or above wherein at least about 1 weight percent of the total surfactant-compatibilizer blend was needed, the surfactant-compatibilizer blends of this invention are able to stabilize, i.e., establish single phase solutions with no precipitate, high aqueous concentrations of water-soluble fertilizers.

EXAMPLE II

Fifty weight percent aqueous concentrations of a 20-20-20 blended water-soluble fertilizer are prepared in twelve 250 ml glass containers. A surfactant system consisting of AquaGro 2000M and the Agrimul PG 2067 is prepared and added to the fertilizer compositions such that total concentrations of from 2.25 to 8.0 weight percent based on the total composition weight and ratios of the phenol ethoxylate to glycoside of from 8:1 to 1:1 are achieved as indicated in Table II below.

TABLE II

| 20-20-20 Fertilizer (Weight %) | AquaGro 2000 M (Weight %) | Agrimul PG 2067 (Weight %) | Weight Ratio AquaGro/ Agrimul | Compatible (Yes/No) |
|---|---|---|---|---|
| 50 | 2.0 | 0.25 | 8:1 | No |
| 50 | 2.0 | 0.5 | 4:1 | No |
| 50 | 2.0 | 1.0 | 2:1 | Yes |
| 50 | 2.0 | 1.25 | 1.6:1 | Yes |
| 50 | 2.0 | 1.5 | 1.33:1 | Yes |
| 50 | 2.0 | 2.0 | 1:1 | Yes |
| 50 | 4.0 | 0.5 | 8:1 | No |

TABLE II-continued

| 20-20-20 Fertilizer (Weight %) | AquaGro 2000 M (Weight %) | Agrimul PG 2067 (Weight %) | Weight Ratio AquaGro/ Agrimul | Compatible (Yes/No) |
|---|---|---|---|---|
| 50 | 4.0 | 1.0 | 4:1 | No |
| 50 | 4.0 | 2.0 | 2:1 | No |
| 50 | 4.0 | 2.5 | 1.6:1 | Yes |
| 50 | 4.0 | 3.0 | 1.33:1 | Yes |
| 50 | 4.0 | 4.0 | 1:1 | Yes |

Thus, as seen from the results in the above Table II, when significant amounts of the nonionic surfactant, e.g., an alkyl phenol ethoxylate are used, the ratio of the nonionic to the surfactant systems of this invention should be less than 2:1 to realize the single phase compatibility results of this invention.

EXAMPLE III

A series of concentrated aqueous solutions are prepared utilizing a water-soluble N—P—K fertilizer mixture at 33 and 40 weight percent fertilizer, viz a 20-10-20 blend. Four surfactants, AG 2000M (a dialkyl phenol ethoxylate), L-62 (a liquid EO/PO block copolymer having about a 1750 mass average molecular weight PO core and a 20 weight percent EO loading), L-64 (a liquid EO/PO block copolymer similar to L-62 with a 40 weight percent EO loading), and NP9 (a monoalkyl phenol ethoxylate) are blended at varying ratios with the compatibilizing agent (Agrimul 2067). Each blend is added, as in Example II, at one or more rates (loading %) to the 20-10-20 fertilizer solutions, which also contains small amounts of chelated trace elements as set forth in Table III below. The aqueous concentrates of each fertilizer/surfactant/compatibilizer blend are evaluated for phase stability and the results disclosed in Table III.

TABLE III

| Weight Percents | | | | | Loading | Fert Conc* | |
|---|---|---|---|---|---|---|---|
| Agrimul 2067 | AG 2000M | L-62 | L-64 | NP-9 | % | 33% | 40% |
| 0 | 2 | | | | 2 | -- | -- |
| 0 | 2 | | | | 3.5 | -- | -- |
| 1.5 | 2 | | | | 3.5 | ++ | +- |
| 1.5 | 2 | | | | 4 | ++ | NT |
| 2 | 2 | | | | 3.5 | ++ | ++ |
| 0 | | 2 | | | 2 | -- | -- |
| 0 | | 2 | | | 3.5 | -- | -- |
| 1 | | 2 | | | 3.5 | -- | -- |
| 2 | | 2 | | | 3.5 | ++ | ++ |
| 0 | | | 2 | | 2 | -- | -- |
| 0 | | | 2 | | 3.5 | -- | -- |
| 1 | | | 2 | | 3.5 | ++ | +- |
| 2 | | | 2 | | 3.5 | ++ | ++ |
| 0 | | | | 2 | 2 | -- | -- |
| 0 | | | | 2 | 3.5 | -- | -- |
| 1.5 | | | | 2 | 3.5 | ++ | ++ |
| 2 | | | | 2 | 3.5 | ++ | ++ |

*-- = incompatible multiphase solution
+- = cloudy solution
++ = compatible, single phase solution
NT = no test As seen from the above results, stable solutions of the four surfactants tested above in combination with concentrated aqueous fertilizer solutions can be obtained so long as a compatibilizer of this invention is present. In particular, both alkyl phenol ethoxylates and EO/PO block copolymers can be used with concentrated aqueous fertilizer solutions and stable solutions achieved so long as the ratio of the alkyl phenol ethoxylate or EO/PO block copolymer to alkyl polyglycoside ratio is less than 2:1.

EXAMPLE IV

Sufficient water-soluble 20-10-20 N—P—K fertilizer is blended in a Continental rotary blender, together with Aqua-Gro 2000M and Agrimul PG 2067 to produce a solid friable granular fertilizer composition comprising 96.5 weight percent of the 20-10-20 fertilizer; 2.0 weight percent of the AquaGro 2000M phenol ethoxylate; and 1.5 weight percent of the Agrimul PG2067 polyglycoside based on the total solid composition. This granular composition is added to a container and blended with sufficient water to produce an aqueous fertilizer concentrate comprising 33 weight percent 20-10-20; 0.67 weight percent AquaGro 2000M; and 0.5 weight percent Agrimul PG 2067. Note that the surfactant system has a phenol ethoxylate to polyglycoside ratio of 1.33:1. The concentrate solution is compatible and remains stable for more than two weeks, i.e., at over two weeks at ambient temperature, the solution remains as a single phase solution with no observable precipitate.

The aforedescribed test is duplicated utilizing in lieu of a 20-10-20 N—P—K fertilizer, a 20-20-20 N—P—K fertilizer and identical results are achieved.

EXAMPLE V

A plant culture medium is prepared comprising an 80:20 blend of sphagnum peat and vermiculite. When the medium is to be in the "pre-treated" condition, 7 fluid ounces per cubic yard of media of the nonionic AquaGro 2000M surfactant is sprayed on and blended into the medium. If not pre-treated, the medium is designated as "untreated".

A series of diluted aqueous fertilizer/surfactant/compatibilizer solutions is prepared from the 20-10-20 tank concentrate of Example IV above. The final fertilizer concentrations of these end-use solutions are 0.01, 0.02, 0.03, and 0.04 weight percent nitrogen expressed as nitrate based on the total aqueous composition weight.

A second series of solutions is prepared using just the fertilizer of the above Example IV, i..e., the 20-10-20 N—P—K fertilizer diluted in water to nitrogen concentration levels (expressed as nitrate) of 0.01, 0.02, 0.03, and 0.04 weight percent respectively, again based on the total aqueous composition weight. Note that these second dilute fertilizer solutions do not contain the surfactant system of the instant invention.

Clear PVC tubes (14 cm. length×6 cm. diameter) with a screen mesh bottom, hereafter referred to as containers, are filled with 200 milliliters of the above described untreated plant culture medium or pre-treated plant culture medium as indicated below. A glass beaker is placed beneath each tube to retain the liquid flow-through. To each pot is then added 200 milliliters of a single dilute fertilizer solution either with the surfactant system of this invention present or not as indicated in Tables IV and V below. The amount of water that is retained upon initial wetting of the different media with the dilute concentrations as well as the uniformity of the moisture distribution achieved, i.e., the percent of the media that was wet is indicated in Tables IV and V respectively.

TABLE IV

Water Retained Upon Initial Wetting (Volume in Milliliters) (T = 0)

| N (Weight Percent) Media/Initial Application | 0 H$_2$O Only | 0.01 | 0.02 | 0.03 | 0.04 |
|---|---|---|---|---|---|
| Untreated/Fertilizer Only | 72 | 78 | 74 | 79 | 70 |
| Untreated/Fertilizer with Surfactant System | — | 80 | 77 | 76 | 78 |
| Pre-Treated/Fertilizer Only | 111 | 114 | 112 | 110 | 113 |
| Pre-Treated/Fertilizer with Surfactant System | — | 109 | 116 | 113 | 113 |

From the above results, it is clear that although very little difference in water retained is realized between using an initial watering with an aqueous solution of the fertilizer alone as opposed to the use of an aqueous fertilizer solution containing the surfactant system of this invention, as expected there is realized a significant increase in initial water retention between the untreated and the pre-treated medium—the pre-treated medium water retention being much higher.

TABLE V

Uniformity of Moisture Distribution Upon Initial Wetting (Percent Media Wet) (T = 0)

| N (Weight Percent) Media/Initial Application | 0 H$_2$O Only | 0.01 | 0.02 | 0.03 | 0.04 |
|---|---|---|---|---|---|
| Untreated/Fertilizer Only | 80 | 91 | 90 | 91 | 86 |
| Untreated/Fertilizer with Surfactant System | — | 93 | 89 | 87 | 88 |
| Pre-Treated/Fertilizer Only | 100 | 100 | 100 | 100 | 100 |
| Pre-Treated/Fertilizer with Surfactant System | — | 100 | 100 | 100 | 100 |

As was the case with the water retained results in Table IV, there is very little difference in the uniformity of moisture distribution in the media between the use of an initial watering with an aqueous solution of the fertilizer alone as opposed to the use of an aqueous fertilizer solution containing the surfactant system of this invention; however, there is realized a significant increase in initial uniformity of moisture distribution between the untreated and the pre-treated media—the pre-treated media uniformity of distribution being much higher.

EXAMPLE VI

A number of containers are prepared as in Example V above, i.e., some are filled with the pre-treated medium and some with the untreated medium. Utilizing the 20-10-20 tank concentrate of Example IV above, two dilute solutions are prepared—one having a nitrogen concentration of 0.01 weight percent, the other having a nitrogen concentration of 0.03 weight percent expressed as nitrate and based on the total diluted composition weight.

Two hundred milliliters of the 0.01 nitrogen solution is poured into each one of one-half of the untreated media pots and the same volume is also poured into each one of one-half of the pre-treated media pots. Similarly, 200 milliliters of the 0.03 nitrogen solution is poured into each one of the balance of the untreated media pots and the same volume is also poured into each one of the balance of the pre-treated media pots. The amounts of nitrogen, phosphorous, and potassium retained in each of the pots is determined.

Table VI below expresses the results as the percent increase in the macro-nutrients retained in each of the media as compared to the results obtained in a similar series of tests using only aqueous fertilizer solutions, i.e., without the surfactant system of the instant invention being present.

TABLE VI

| Media N (Weight | Nitrate | Nitrogen | Phosphorus | | Potassium | |
|---|---|---|---|---|---|---|
| Percent) | 0.01 | 0.03 | 0.01 | 0.03 | 0.01 | 0.03 |
| Pre-Treated | None | 11% | 17.9% | 0.1% | 0.86% | 38.8% |
| Untreated | 27.1% | 44.4% | 13.5% | 3.8% | 274.4% | 46.3% |

The results show that by irrigating plant culture media with the diluted fertilizer solutions of this invention, i.e., those containing the water-soluble fertilizer together with the surfactant system of this invention, one can achieve increases in the retention of macronutrients over similar irrigation treatments with aqueous fertilizer solutions alone. The increases in nutrient retention using the compositions of this invention in untreated media are particularly significant. The degree of leaching of macronutrients which is observed to occur with untreated media has, to a great extent, been obviated by use of the surfactant treated fertilizer compositions of this invention. Significant reduction in the macronutrient leaching that occurs in pre-treated media is also observed.

EXAMPLE VII

A plant culture medium is treated with 300 ppm N solutions using several 20-10-20 fertilizer formulations (fertilizer, fertilizer +AG2000M +compatibilizer(CA); fertilizer+AG2000M, fertilizer+compatibilizing agent).

In both the medium pre-treated as in Example V (Table VII) and untreated medium (Table VIII), optimal phosphorous retention is observed when the media are subsequently treated using a fertilizer that contained AG2000M and the compatibilizing agent. All increases in phosphorous retention are significantly better than for the standard fertilizer or the fertilizer containing either AG2000M or the compatibilizer alone. Statistically significant increases in $NO_3$ retention are observed in untreated media irrigated with solutions made from the fertilizer/AG 2000M/compatibilizer product.

Even though reduced leaching of certain fertilizer constituents is observed with the fertilizer/AG2000M/compatibilizer solution of this invention, the fertilizer+AG2000M and the fertilizer+compatibilizer solutions do not generally enhance retention over the standard fertilizer treatment.

TABLE VII

FERTILIZER RETAINED (ppm) IN
TREATED MEDIA AFTER IRRIGATING

Media Irrigated With 300 ppm (N) Solution

| Treatments | $NO_3$ | $NH_4$ | P | K |
|---|---|---|---|---|
| Fertilizer alone | 105.65 c* | 201.41 b | 231.55 d | 109.79 a |
| Fertilizer + AG 2000 M + CA | 116.91 a | 209.75 a | 236.53 a | 120.19 a |
| Fertilizer + AG 2000 M | 117.12 a | 212.98 a | 234.67 b | 122.73 a |
| Fertilizer + CA | 114.13 b | 209.84 a | 233.49 c | 112.55 a |

*Numbers followed by the same letter are not significantly different at the 0.05 level of probability according to Duncan's multiple range test.

TABLE VIII

FERTILIZER RETAINED (ppm) IN
UNTREATED MEDIA AFTER IRRIGATING

Media Irrigated With 300 ppm (N) Solution

| Treatments | $NO_3$ | $NH_4$ | P | K |
|---|---|---|---|---|
| Fertilizer alone | 107.42 d | 181.01 ab | 231.27 b | 72.34 bc |
| Fertilizer + AG 2000 M + CA | 117.23 a | 186.03 a | 233.58 a | 83.46 a |
| Fertilizer + AG 2000 M | 112.53 b | 181.27 ab | 230.51 b | 76.05 abc |
| Fertilizer + CA | 109.81 c | 177.43 b | 225.93 c | 65.53 c |

EXAMPLE VIII

A series of diluted aqueous fertilizer solutions is prepared from the 20-10-20 tank concentrate of Example IV above. The final fertilizer concentrations of these end-use solutions are 0.01, 0.02, 0.03, and 0.04 weight percent nitrogen expressed as the nitrate and based on the total composition weight.

A second series of solutions is prepared using just the fertilizer of the above Example IV, i.e., the 20-10-20 N—P—K fertilizer diluted in water to nitrogen concentration levels of 0.01, 0.02, 0.03, and 0.04 weight percent nitrogen expressed as the nitrate respectively and based on the total composition weight. Note that this second series of solutions does not contain the surfactant systems of this invention.

A number of containers as described in Example V above are filled with the sphagnum peat (80):vermiculite (20) blend of Example V. One-half of the containers are filled with pre-treated media and the other half, the untreated media.

One-half of the pre-treated media containers is divided into five groups. In the first group, 200 ml of pure water is applied. In the second group 200 ml of the fertilizer only (0.01 nitrogen conc.) is applied. To the third group of pre-treated media pots, 200 ml of the 0.02 nitrogen weight percent solution is applied and so on as indicated in Table IX below.

The other half of the pre-treated media containers is also divided into five groups. In the first group, 200 ml pure water is applied. To the second group, 200 ml of the (0.01 nitrogen conc.) fertilizer-surfactant system of this invention described above is applied. To the third group, 200 ml of the (0.02 nitrogen conc.) fertilizer-surfactant system is applied and so on as indicated in Table IX below.

The same procedure as above described for the pre-treated media containers is also performed on the containers filled with the untreated plant culture media After the above applications are completed, all of the media is dried to a water level of less than 10% over a ten-day period. At that time, all of the media are transferred to new containers and rewet with 200 ml of water.

Measurements taken (milliliters) on the water retained by each of the containers after such rewetting are set forth in Table IX below and the uniformity of the rewettting expressed as percent wet for each of the containers are set forth in Table X below.

TABLE IX

Water Retained (ml) Upon 10 Day Rewetting

| | | Fertilizer (Express As N conc. weight percent) In Initial Watering (T = 0) | | | | |
|---|---|---|---|---|---|---|
| Media | Initial Application | 0(H$_2$O) | 0.01 | 0.02 | 0.03 | 0.04 |
| Untreated | Fert. w/o Surf. Sys. | 74 | 102 | 100 | 98 | 111 |
| Untreated | Fert. w Surf. Sys. | 74 | 145 | 126 | 129 | 133 |
| Percent Increase in Water Retention | | — | 40 | 26 | 30 | 20 |
| Pre-Treated | Fert. w/o Surf. Sys. | 141 | 144 | 146 | 147 | 146 |
| Pre-Treated | Fert. w Surf. Sys. | — | 140 | 143 | 147 | 142 |

TABLE X

Water Uniformity (%) Upon 10 Day Rewetting

| | | Fertilizer (Expressed As N conc. weight percent) In Initial Watering (T = 0) | | | | |
|---|---|---|---|---|---|---|
| Media | Initial Application | 0(H$_2$O) | 0.01 | 0.02 | 0.03 | 0.04 |
| Untreated | Fert. w/o Surf. Sys. | 47 | 73 | 77 | 77 | 88 |
| Untreated | Fert. w Surf. Sys. | 47 | 90 | 95 | 96 | 97 |
| Percent Increase in Uniformity of Wetting | | — | 23 | 23 | 23 | 10 |
| Pre-Treated | Fert. w/o Surf. Sys. | 100 | 100 | 100 | 100 | 100 |
| Pre-Treated | Fert. w Surf. Sys. | — | 100 | 100 | 100 | 100 |

From the results depicted in Table IX above, it can be observed that if one chooses to pre-treat the plant culture media, one can get significant water retention when the dry media is irrigated at a later period of time. Also, as can be seen from Table X, the 100% uniformity is able to be obtained again upon the later rewatering of the dried pre-treated media. Whether or not the pre-treated media is treated initially with an aqueous fertilizer solution or the aqueous fertilizer-surfactant system solutions of this invention does not appear to be a significant factor with respect to the rewetting water retention or water uniformity in pre-treated media.

However, the results of Table IX also show that in untreated plant culture media, very high water retention, upon rewatering of the dried untreated media, can be achieved—essentially as high as that realized with pre-treated media—if the untreated media is initially fertilized with the compositions of this invention, i.e., the fertilizer-surfactant system blends.

The results in Table X illustrate a similar and surprising phenomenon with regards to the uniformity levels. Note the high percentages achieved when the untreated plant culture media is first subjected to an application of the fertilizer-surfactant system blends of this invention as opposed to the use of initial fertilizer applications alone.

Thus, the instant invention permits the use of untreated plant culture media that, after acceptance of initial fertilizer treatment and drying, can realize significant rewatering water retention and uniformity while obviating the nutrient leaching that accompanies use of untreated media and standard water soluble fertilizers.

Without further elaboration, the foregoing will so fully illustrate our invention that others may, by applying current or future knowledge, adopt the same for use under various conditions of service.

What is claimed is:

1. A water-soluble, flowable particulate fertilizer composition consisting essentially of:
   i) water-soluble fertilizer; and
   ii) a surfactant system consisting essentially of:
      a) alkyl polyglycoside; and
      b) a nonionic surfactant selected from the group consisting of an alkyl phenol ethoxylate, an ethylene oxide-propylene oxide block copolymer, an ethoxylated aliphatic alcohol, and mixtures thereof
   wherein the ratio of the nonionic surfactant to the polyglycoside is from 2:1 to 1:1.

2. The water-soluble fertilizer of claim 1 wherein the fertilizer is present from 65 to 99 weight percent; and the surfactant system is present from 1 to 35 weight percent, all weight percents being based on the total weight of the fertilizer composition.

3. The water-soluble fertilizer of claim 2 wherein the surfactant system consists essentially of:
   a) alkyl phenol ethoxylate or ethylene oxide-propylene oxide block copolymer; and
   b) alkyl polyglycoside.

4. The water-soluble fertilizer composition of claim 3 wherein the surfactant system consists essentially of:
   a) ethylene oxide-propylene oxide block copolymer; and
   b) alkyl polyglycoside.

5. An aqueous fertilizer composition consisting essentially of:
   i) water soluble fertilizer;
   ii) a surfactant system consisting essentially of:
      a) alkyl polyglycoside; and
      b) a nonionic surfactant selected form the group consisting of an alkyl phenol ethoxylate, an ethylene oxide-propylene oxide block copolymer, an ethoxylate aliphatic alcohol, and mixtures thereof
   wherein the ratio of the nonionic surfactant to the polyglycoside is from 2:1 to 1:1; and
   iii) water.

6. The aqueous fertilizer composition of claim 5 wherein the surfactant system consists essentially of:
   a) alkyl phenol ethoxylate or ethylene oxide-propylene oxide block copolymer; and
   b) alkyl polyglycoside.

7. A process for reducing the nutrient leaching characteristics and enhancing the water retention upon rewetting characteristics of solid plant culture media comprising the steps of:
   A) preparing an aqueous water-soluble fertilizer concentrate consisting essentially of:
      i) from 20 to 50 weight percent of a water-soluble fertilizer;
      ii) from 0.5 to 10 weight percent of a surfactant system consisting essentially of:
         a) alkyl polyglycoside; and
         b) a nonionic surfactant selected from the group consisting of an alkyl phenol ethoxylate, an ethylene oxide-propylene oxide block copolymer, an ethoxylated aliphatic alcohol, and mixtures thereof;
wherein the ratio of the nonionic surfactant to the polyglycoside is from 2:1 to 1:1; and
iii) water
wherein all weight percents are based on the total weight of the concentrate;

B) adding additional water to the concentrate to form a dilute fertilizer solution; and C) treating the solid media with a fertilizingly effective amount of said dilute solution.

8. The process of claim 7 wherein the nonionic surfactant is alkyl phenol ethoxylate or ethylene oxide-propylene oxide block copolymer.

9. The process of claim 7 wherein the nonionic surfactant is ethylene oxide-propylene oxide block copolymer.

10. The process of claim 7 wherein said plant culture media is untreated by a surfactant or wetting agent prior to the treating step.

* * * * *